(12) United States Patent
Taylor et al.

(10) Patent No.: US 8,140,796 B2
(45) Date of Patent: Mar. 20, 2012

(54) SERIAL ADVANCED TECHNOLOGY ATTACHMENT WRITE PROTECTION: MASS STORAGE DATA PROTECTION DEVICE

(75) Inventors: Eric Taylor, Carson City, NV (US); Tina Leary, Reno, NV (US); James Stockdale, Clio, CA (US)

(73) Assignee: IGT, Reno, NV (US)

( * ) Notice: Subject to any disclaimer, the term of this patent is extended or adjusted under 35 U.S.C. 154(b) by 502 days.

(21) Appl. No.: 11/965,009

(22) Filed: Dec. 27, 2007

(65) Prior Publication Data
US 2009/0172227 A1    Jul. 2, 2009

(51) Int. Cl.
*G06F 12/14*    (2006.01)
(52) U.S. Cl. ........................ 711/163; 711/112
(58) Field of Classification Search ............... None
See application file for complete search history.

(56) References Cited

U.S. PATENT DOCUMENTS

| | | |
|---|---|---|
| 39,368 A | 7/1863 | Lazelle |
| 39,369 A | 7/1863 | Arick |
| 39,370 A | 8/1863 | Alexander |
| 39,400 A | 8/1863 | Hull |
| 39,401 A | 8/1863 | Hull |
| 5,083,271 A | 1/1992 | Thacher et al. |
| 5,126,890 A | 6/1992 | Wade et al. |
| 5,755,621 A | 5/1998 | Marks et al. |
| 5,917,725 A | 6/1999 | Thacher et al. |
| 5,954,583 A | 9/1999 | Green |
| 6,106,396 A | 8/2000 | Alcorn et al. |
| 6,142,872 A | 11/2000 | Walker et al. |
| 6,142,876 A | 11/2000 | Cumbers |
| 6,149,522 A | 11/2000 | Alcorn et al. |
| 6,206,782 B1 | 3/2001 | Walker et al. |
| 6,234,900 B1 | 5/2001 | Cumbers |
| 6,354,592 B1 | 3/2002 | Virzi |
| 6,361,441 B1 | 3/2002 | Walker et al. |
| 6,447,935 B1 | 9/2002 | Zhang et al. |
| 6,488,581 B1 | 12/2002 | Stockdale |
| 6,503,146 B2 | 1/2003 | Walker et al. |

(Continued)

FOREIGN PATENT DOCUMENTS

EP    1063580 A2    12/2000

(Continued)

OTHER PUBLICATIONS

US Ex Parte Reexamination Certificate (6874th), US RE39,368 F1, issued Jun. 16, 2009, Alcorn et al, entitled: "Electronic Casino Gaming System With Improved Play Capacity, Authentication and Security".

(Continued)

*Primary Examiner* — Than Nguyen
(74) *Attorney, Agent, or Firm* — Weaver Austin Villeneuve & Sampson LLP

(57) ABSTRACT

A mass storage device protection system may have a mass storage device, a processor configured to generate at least one serial write command signal to the mass storage device via a serial communication link, and a storage protector configured for communication with the processor and mass storage device, the storage protector configured to do the following: intercept the at least one serial write command signal, and determine whether the at least one serial write command signal comprises an authorized command signal or an unauthorized command signal.

12 Claims, 10 Drawing Sheets

U.S. PATENT DOCUMENTS

| | | | |
|---|---|---|---|
| 6,565,443 B1 | 5/2003 | Johnson et al. |
| 6,595,856 B1 | 7/2003 | Ginsburg et al. |
| 6,620,047 B1 | 9/2003 | Alcorn et al. |
| 6,629,184 B1 | 9/2003 | Berg et al. |
| 6,685,567 B2 | 2/2004 | Cockerille et al. |
| 6,712,699 B2 | 3/2004 | Walker et al. |
| 6,722,986 B1 | 4/2004 | Lyons et al. |
| 6,733,390 B2 | 5/2004 | Walker et al. |
| 6,823,419 B2 | 11/2004 | Berg et al. |
| 6,837,793 B2 | 1/2005 | McClintic |
| 6,848,994 B1 | 2/2005 | Knust et al. |
| 6,875,109 B2 | 4/2005 | Stockdale |
| 6,884,174 B2 | 4/2005 | Lundy et al. |
| 7,043,641 B1 | 5/2006 | Martinek et al. |
| 7,063,615 B2 | 6/2006 | Alcorn et al. |
| 7,070,505 B2 | 7/2006 | Vancura et al. |
| 7,108,605 B2 | 9/2006 | LeMay et al. |
| 7,111,141 B2 | 9/2006 | Nelson |
| RE39,368 E | 10/2006 | Alcorn et al. |
| RE39,369 E | 10/2006 | Alcorn et al. |
| RE39,370 E | 10/2006 | Alcorn et al. |
| RE39,400 E | 11/2006 | Alcorn et al. |
| RE39,401 E * | 11/2006 | Alcorn et al. | 463/29 |
| 2002/0049909 A1 | 4/2002 | Jackson et al. |
| 2002/0111209 A1 | 8/2002 | Walker et al. |
| 2002/0128057 A1 | 9/2002 | Walker et al. |
| 2002/0147049 A1 | 10/2002 | Carter |
| 2002/0160825 A1 | 10/2002 | Nicastro et al. |
| 2003/0014639 A1 | 1/2003 | Jackson et al. |
| 2004/0063494 A1 | 4/2004 | Oram et al. |
| 2004/0139260 A1 * | 7/2004 | Steinmetz et al. | 710/269 |
| 2004/0204235 A1 | 10/2004 | Walker et al. |
| 2004/0242297 A1 | 12/2004 | Walker et al. |
| 2004/0242303 A1 | 12/2004 | Walker et al. |
| 2005/0192099 A1 | 9/2005 | Nguyen et al. |
| 2005/0277463 A1 | 12/2005 | Knust et al. |
| 2006/0014579 A1 | 1/2006 | Kane et al. |
| 2006/0025197 A1 | 2/2006 | Kane et al. |
| 2006/0035713 A1 | 2/2006 | Cockerille et al. |
| 2006/0063575 A1 | 3/2006 | Gatto et al. |
| 2006/0063594 A1 | 3/2006 | Benbrahim |
| 2006/0073870 A1 | 4/2006 | Cannon |
| 2006/0082056 A1 | 4/2006 | Kane et al. |
| 2006/0205479 A1 | 9/2006 | Schultz |
| 2006/0211479 A1 | 9/2006 | Walker et al. |
| 2006/0211480 A1 | 9/2006 | Walker et al. |
| 2006/0217176 A1 | 9/2006 | Walker et al. |
| 2006/0240892 A1 | 10/2006 | Walker et al. |
| 2006/0247013 A1 | 11/2006 | Walker et al. |
| 2006/0247014 A1 | 11/2006 | Walker et al. |
| 2006/0252521 A1 | 11/2006 | Gururajan et al. |
| 2006/0252554 A1 | 11/2006 | Gururajan et al. |
| 2006/0259604 A1 | 11/2006 | Kotchavi et al. |
| 2006/0272027 A1 * | 11/2006 | Noble | 726/27 |
| 2007/0005871 A1 | 1/2007 | Zimmer et al. |
| 2007/0026935 A1 | 2/2007 | Wolf et al. |
| 2007/0143555 A1 | 6/2007 | Nemiroff et al. |
| 2008/0052728 A1 * | 2/2008 | Steinmetz et al. | 719/313 |
| 2010/0077138 A1 * | 3/2010 | Bauernfeind | 711/104 |

FOREIGN PATENT DOCUMENTS

| | | |
|---|---|---|
| EP | 1063580 A3 | 12/2000 |
| WO | WO2009/086002 A1 | 7/2009 |

OTHER PUBLICATIONS

US Ex Parte Reexamination Certificate (6822$^{nd}$), US RE39,369 F1, issued May 19, 2009, Alcorn et al, entitled: "Electronic Casino Gaming System With Improved Play Capacity, Authentication and Security".

US Ex Parte Reexamination Certificate (6897$^{th}$), US RE39,400 F1, issued Jun. 30, 2009, Alcorn et al, entitled: "Electronic Casino Gaming System With Improved Play Capacity, Authentication and Security".

US Ex Parte Reexamination Certificate (6999$^{th}$), US RE39,401 F1, issued Aug. 18, 2009, Alcorn et al, entitled: "Electronic Casino Gaming System With Improved Play Capacity, Authentication and Security".

International Search Report and Written Opinion issued in PCT/US2008/087517, dated May 8, 2009, 13 pp.

Yuan et al., "Virtual Private Networks—Technologies and Solutions", Addison-Wesley, ISBN#0-201-70209-6, Apr. 2001 (8 pages).

* cited by examiner

SERIAL ADVANCED TECHNOLOGY ATTACHMENT WRITE PROTECTION: MASS STORAGE DATA PROTECTION DEVICE

FIELD OF THE INVENTION

The present invention relates generally to a mass storage device protection system. More particularly, the present invention relates to mass storage device protection system in a gaming machine using serial advanced technology attachment (SATA) integrated drive electronic (IDE) technology to protect the mass storage device from unauthorized commands.

BACKGROUND OF THE INVENTION

Regulations within the gaming industry have historically proscribed "writable" memory devices for the storage of computer codes that control the payoff aspects associated with a gaming machine. These code routines are so critical to operation that their corruption, either accidentally or deliberately, could result in cheating players. If such corruption occurred, even infrequently, it could pose a significant threat to the integrity of gaming operations. The storage of these codes is typically handled by a less volatile type of memory device, such as a read-only memory (ROM) or erasable programmable read-only memory (EPROM).

As the gaming industry moves toward game designs that utilize more multimedia style game presentation, the need for increased memory storage for game codes, graphics, sound, video, and the like grows dramatically. The use of EPROM style devices for data storage is becoming a significant burden and hindrance to the development of the gaming machines with enhanced capabilities. The use of cost effective, higher density mass storage devices is necessary.

In the personal computer industry, the need for large amounts of nonvolatile mass storage has not been nearly as significant. In fact, the opposite scenario is actually occurring. Current personal computer operating systems rely on the fact that data can be stored on the mass storage devices such as hard disks. This allows these operating systems to support virtual memory configurations, storage of recent web sites visited, storage of temporary recovery files in the event of a power interruption, and the like.

Gaming machines currently utilize parallel advanced technology attachment (PATA) IDE technology. The existing circuitry utilizes one of two techniques to protect the mass storage device from unauthorized commands. First, circuitry can electrically reside in the data stream between the PATA host and the mass storage device to intercept commands from the PATA host to the mass storage device. The PATA host characterizes the command as allowed or disallowed. The command is forwarded to the mass storage device if the command is allowed. Otherwise, the command is rejected and an invalid command is intentionally substituted and sent to the mass storage device. An error message is also sent to the PATA host to signal it of the fault condition.

Another technique provides for circuitry placed electrically adjacent to the data stream between the PATA host and mass storage device. The circuitry monitors each command from the host to the mass storage device. If a command is disallowed, an error bit is flagged in the control register and/or a non-maskable interrupt is set to the system. A hardwired reset line is also asserted to the mass storage device to prevent the disallowed operation from affecting the data content of the drive. Bypass of the mass storage protection system is also provided by manually installing a shorting jumper across a two pin header signaling the mass storage data protection device that all commands are now allowed.

OVERVIEW

The present invention relates to a mass storage device protection system using serial technology to prevent unauthorized commands to the mass storage device. In one embodiment, a mass storage device protection system may have a mass storage device, a processor configured to generate at least one serial write command signal to the mass storage device via a serial communication link, and a storage protector configured for communication with the processor and mass storage device, the storage protector configured to do the following: intercept the at least one serial write command signal, and determine whether the at least one serial write command signal comprises an authorized command signal or an unauthorized command signal.

In another embodiment, a gaming machine may have a cabinet to house a plurality of gaming machine components, a control system housed within the cabinet, comprising: a mass storage device, a processor configured to generate at least one serial write command signal to the mass storage device via a serial communication link, and a storage protector configured for communication with the processor and mass storage device. The storage protector may be configured to do the following: intercept the at least one serial write command signal, and determine whether the at least one serial write command signal comprises an authorized command signal or an unauthorized command signal. The gaming machine may also have means for providing a wagering game and means for receiving a wager to play the wagering game.

Another embodiment provides for a method for protecting a mass storage device in a comprising receiving a serial write command to the mass storage device via a serial communication link, intercepting the at least one serial write command by a storage protector, replicating the at least one serial write command to form a first serial write command signal and a second serial write command signal, transmitting the first serial write command signal to the mass storage device, comparing the second write command signal to a user write command in a register, and determining whether the second write command signal matches the user write command In yet another embodiment, a mass storage device protection system may have a mass storage device, and a controller configured for communication with the mass storage device, the controller having: a processor configured to generate at least one serial write command signal to the mass storage device via a serial communication link, and a storage protector configured for communication with the processor to determine whether the at least one serial write command signal comprises an authorized command signal or an unauthorized command signal.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Figure 1:
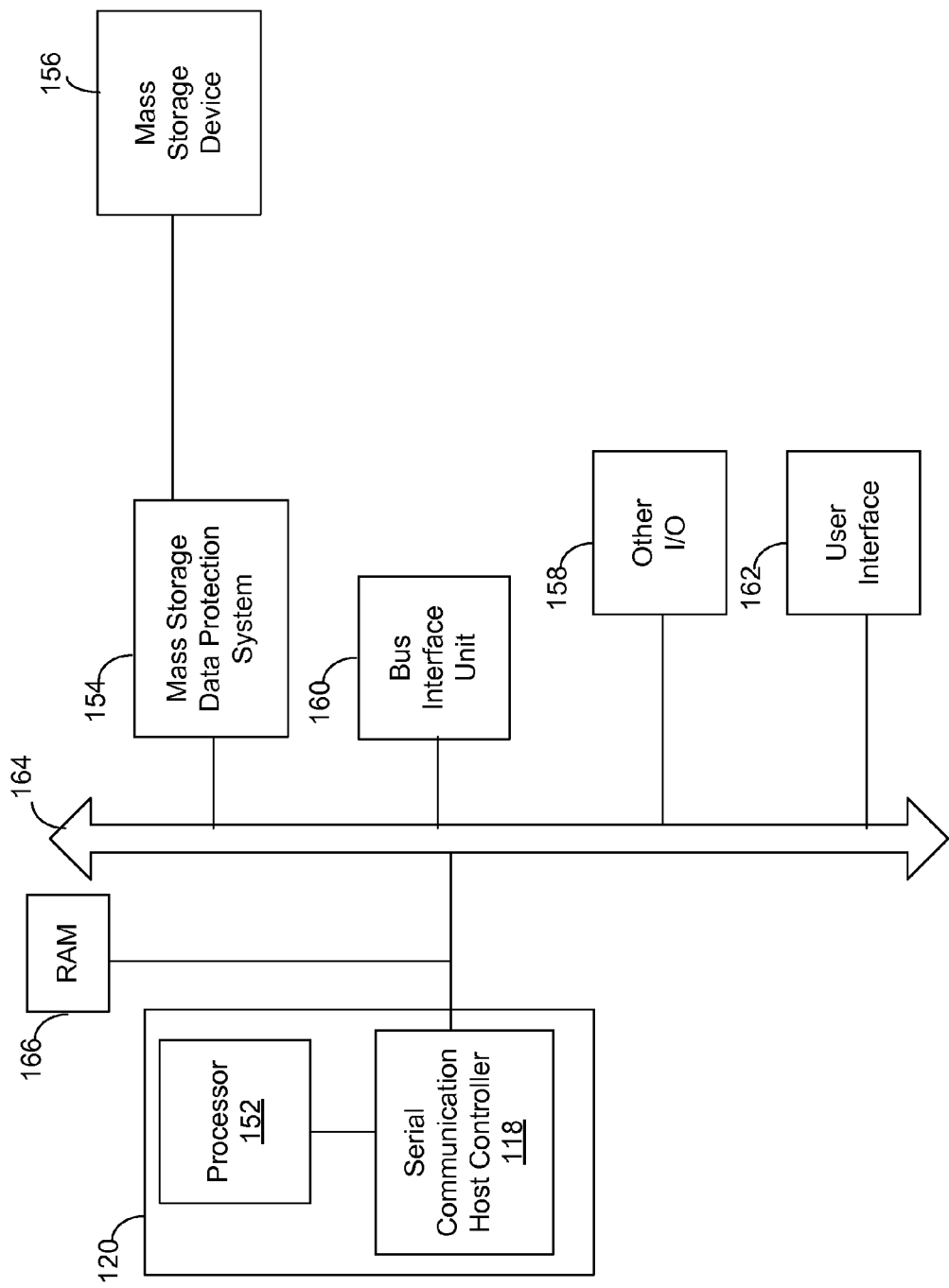
FIG. 1 is a schematic illustration of an embodiment of a master gaming control system.

Embodiments are described herein in the context of a mass storage data protection device in serial communications. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In this application, numerous specific details are set forth in order to provide a thorough understanding of the present invention. However, the present invention may be practiced without some or all of these specific details. In other instances, well known process steps have not been described in detail in order not to obscure the present invention.

Reference will now be made in detail to some specific examples of the invention, including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors for similar purposes, while remaining within the scope of the present invention.

Similarly, the steps of the methods shown and described herein are not necessarily all performed (and in some implementations are not performed) in the order indicated. Moreover, some implementations of the methods discussed herein may include more or fewer steps than those shown or described.

Furthermore, the techniques and mechanisms of the present invention will sometimes describe and/or illustrate a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, an indicated connection does not necessarily mean a direct, unimpeded connection unless otherwise noted. Moreover, there may be other connections between entities than are indicated herein, e.g., in network diagrams.

Figure 5:
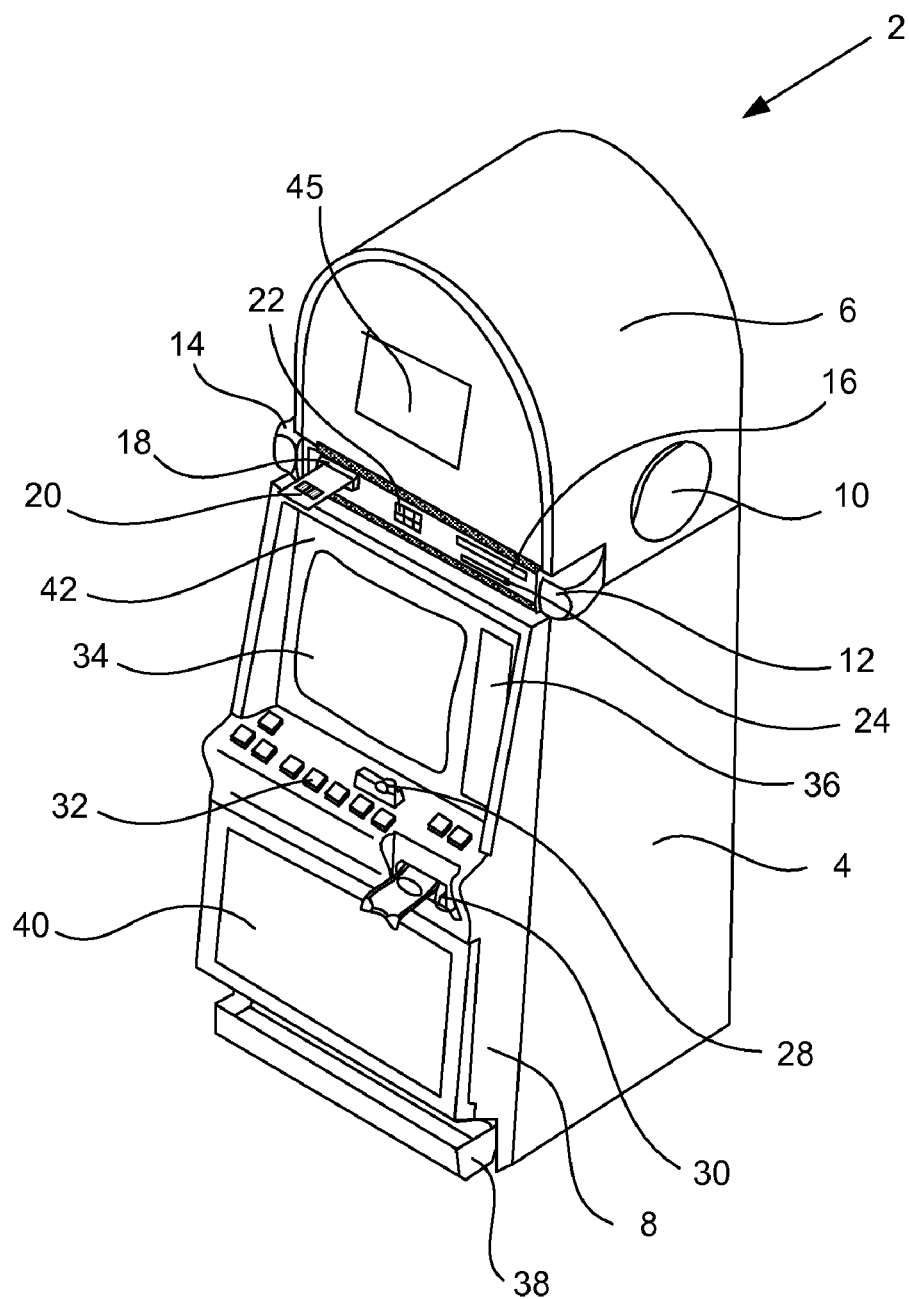
FIG. 5 illustrates an example gaming machine for implementing embodiments of the present invention.

Some implementations discussed below relate to a mass storage device protection system using SATA IDE technology to prevent unauthorized commands to the mass storage device. The emergence of SATA IDE technology has provided for a substantial reduction in the number of harness conductors (seven in SATA drive technology vs. forty in PATA drive technology) which allows for simpler harness routing and improved cooling air flow in confined spaces. The SATA IDE technology also provides for faster data transfer rates (150 MB/sec in SATA drive technology vs. 100 MB/sec in PATA drive technology). The use of SATA drive technology in gaming machines is appealing since gaming machines rely on mass storage devices to provide large quantities of data for game presentation as well as data requirements for other software applications. Furthermore, since the heat generating electronics are positioned in relatively confined spaces, using SATA device technology would help in cooling air flow in the gaming machine as illustrated in FIG. 5 below. Although the implementations and embodiments are discussed using SATA technology, it will now be known that the invention may also be used with other serial protocols suitable for high speed communication such as, for example, PCI-express, serial Small Computer System Interface (SCSI), serial fiber optic communication, universal serial bus (USB), and the like.

FIG. 1 is a schematic illustration of an embodiment of a master gaming control system. A host system 120 may have a logic device, such as processor 152, to execute operating software for the gaming machine. The host system 120 may also have a serial communication host controller 118 to serially connect processor to other network and storage devices as discussed below.

During operation, processor 152 may communicate, through serial communication host controller 118, with mass storage device 156 via communication link 164 and mass storage device protection system 154. Processor 152 may communicate with mass storage device protection system 154 via communication link 164 and bus interface unit 160. Communication link 164 may be any type of known bus such as a Peripheral Component Interconnect (PCI), PCI-express, Industry Standard Architecture (ISA), optical drive, and the like.

Processor 152 may also communicate with user interface 162, which for the gaming machine shown in FIG. 5, may include player-input switches or buttons 32, coin acceptor 28, bill validator 30, display 34, and the like. Processor 152 may also communicate with other devices such as random access memory (RAM) 166, as well as other memory and input-output (I/O) devices 158 which may include serial or parallel ports, a universal serial bus, a floppy disk drive, or other types of memory and I/O devices. It will now be recognized that other configurations for the master gaming control system are possible.

Mass storage device protection system 154 will now be described in detail. Since the primary protection of the mass storage device in a gaming machine may be to prevent unauthorized writing to the mass storage device, the system will be described with reference to protecting the mass storage device from unauthorized write commands. However, it will now be known and understood that other commands, as desired, may also be included for protection of the mass storage device.

Mass storage device protection system 154 may provide protection for a single mass storage channel. Additional mass storage device protection systems may be replicated to protect additional mass storage channels.

Figure 2A:
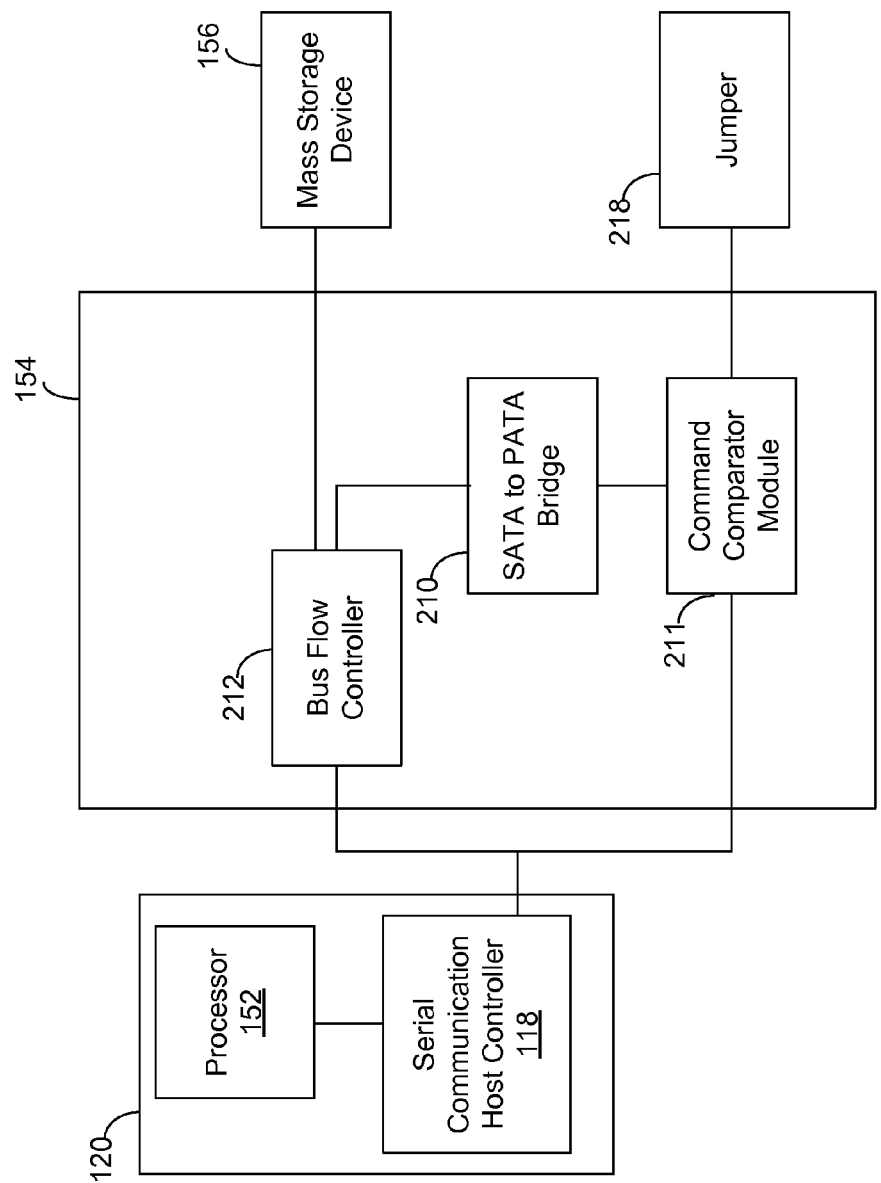
FIGS. 2A, 2B and 2C illustrate one embodiment of a mass storage device protection system and an example method for protecting the mass storage device.
Figure 2B:
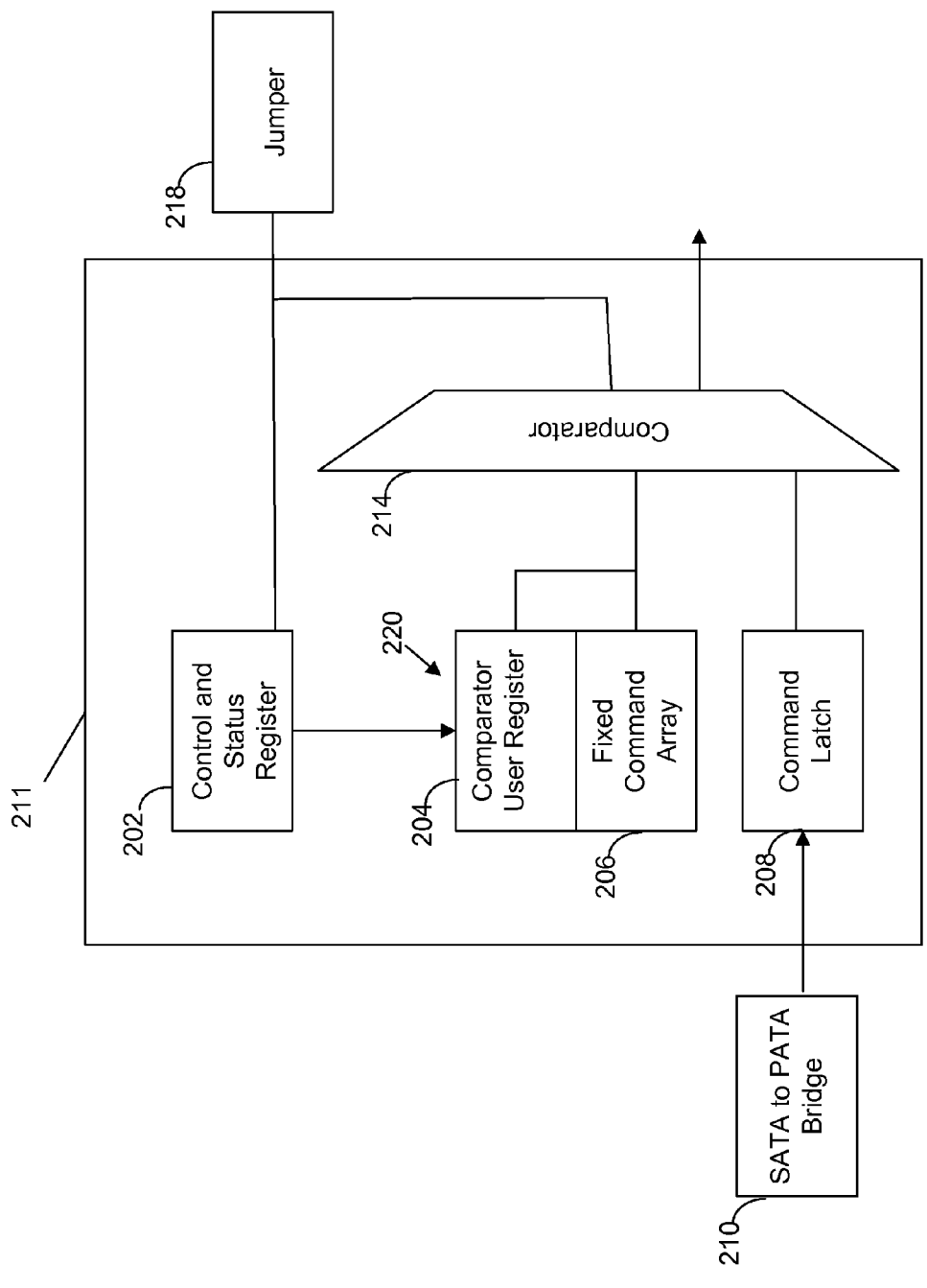
Figure 2C:
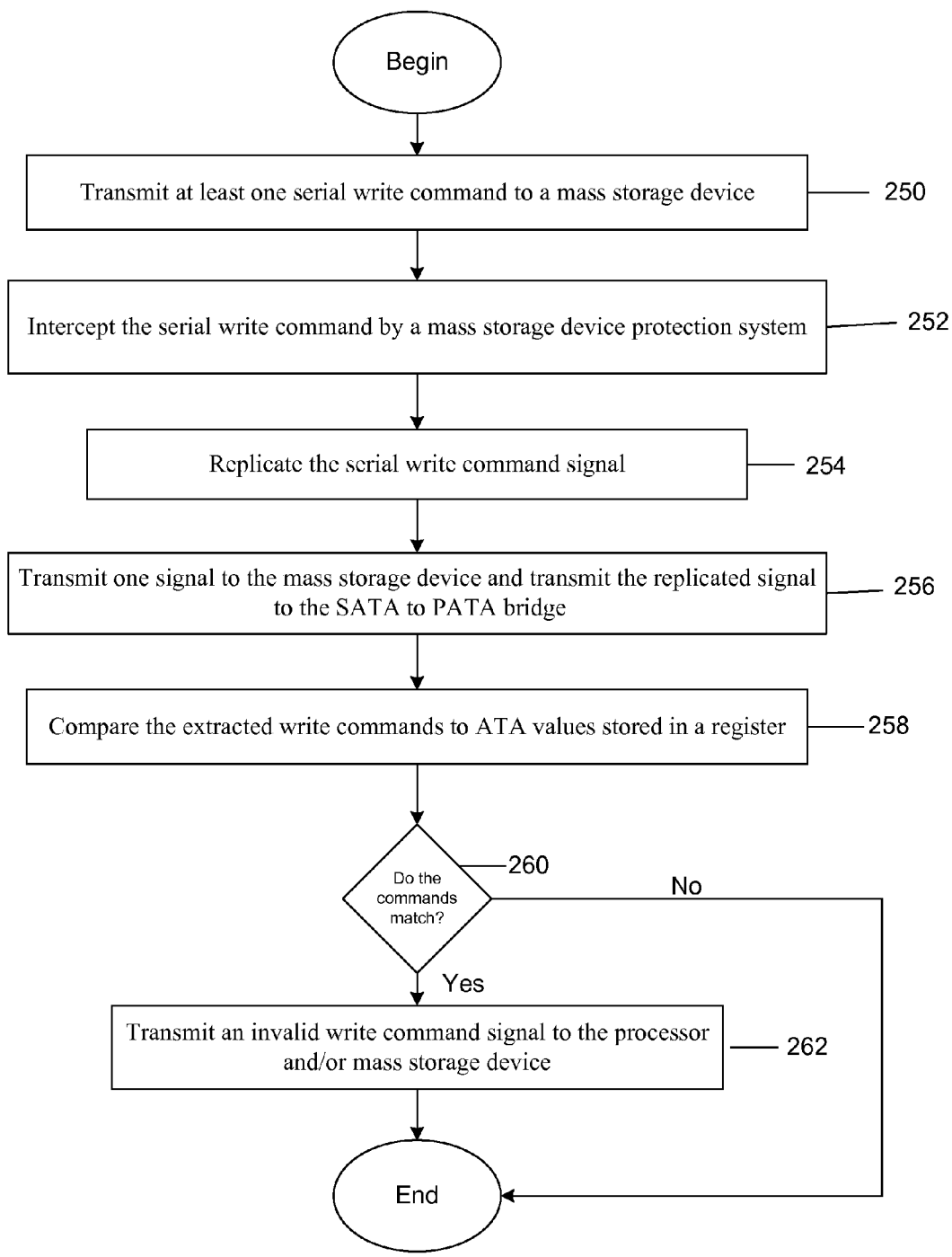

FIGS. 2A and 2B illustrate one embodiment of a mass storage device protection system and FIG. 2C illustrates a block diagram of an example method for protecting the mass storage device. Although illustrated with specific components, configuration, bit assignments, and the like, the illustration is for illustrative and exemplary purposes only and not intended to be limiting as other components may be used, different bit assignments may be used, and different configurations may be utilized.

FIG. 2A illustrates an example mass storage device protection system 154 having a bus flow controller 212, a translator, such as a SATA to PATA bridge 210, and a command comparator module 211. Referring to FIGS. 2A and 2C, a logic device (such as a processor, a programmable logic device, or the like), e.g., a logic device of host system 120, may transmit at least one serial write command to the mass storage device at 250. The mass storage device protection system 154 may intercept the serial write command at 252. The serial write commands sent to the mass storage device 156 may be any serial command signal, such as a SATA write command signal. The serial write command signals may be received by bus flow controller 212, which may control the signals to be transmitted to multiple logic signal channels. The serial write command signal received by the bus flow controller 212 may be replicated at 254. For example, one signal may be transmitted to the mass storage device 156 and the replicated signal may be transmitted to the SATA to PATA bridge 210 at 256. The SATA to PATA bridge may convert or de-serialize the serial signal to allow for the use of the existing PATA technology with a SATA IDE interface. By functioning as a signal replicator, bus flow controller 212 may monitor the signal without breaking into the stream of communication. Bus flow controller 212 may allow any permutation of communication between the host and any downstream devices such as the SATA to PATA bridge 210, command comparator module 211, and the like. Bus flow controller 212 may also be configured to act as a switch between the host system 120 and mass storage device 156 and interrupt the signal between the host system 120 and mass storage device 156. Bus flow controller 212 may be embodied in various devices configured for the functionality described herein, such as a switch, multiplexer, or a similar device.

FIG. 2B illustrates an example of the command comparator module of FIG. 2A. The command comparator module 211 may be implemented in a logic device, such as a processor, a programmable logic device, or the like. In this example, command comparator module 211 includes a control and status register 202, a command latch 208, a comparator 214, and a register 220 having a comparator user register 204 and a fixed command array 206. Control and status register 202 may provide information regarding the function of the circuit. The control and status register 202 may be implemented in various sizes, according to the desired embodiment. In this example, control and status register 202 is implemented as an 8 bit register. Two or three bits (e.g., bits 0 and 1 or bits 0, 1 and 2) may serve as the comparator user register 204 address pointer.

Another bit (e.g., bit 5) may be used to determine when a write fault that is generated should be an interrupt, e.g., a non-maskable interrupt (NMI). An NMI is an interrupt that cannot be ignored or disabled. The NMI may immediately signal the gaming machine system that a significant event has occurred which requires its attention. The interrupt may be used to report non-recoverable hardware errors, unauthorized write commands, and the like. In this example, if this bit is set high, then any faults generated by the mass storage device protection system 154 will be an NMI. If faults are going to be used to create NMIs, then the system must deal with any write faults. Hence, this bit and NMIs are used to make the system an active one as opposed to a passive one. This bit may be set high or low by processor 152.

One or more other bits may be used to indicate whether the mass storage device is in a write-enabled state. In this example, bit 6 indicates the state of write-enable jumper 218, which may be a jumper plug and pinheads, a switch, or other device for changing the state of the write-enable signal. This may be a hardware override of the mass storage device protection system. The pinheads may be sealed in the brain box, which also houses the master gaming controller. As is generally known, a "brain box" is typically a sheet metal enclosure within the gaming machine that is adapted to house a number of critical components, such as the master gaming controller or processor, as well as various memory devices, such as some RAM, NVRAM, the hard drive, and other such components. The brain box can come with a lock, and may be removable from the gaming machine as an entire unit in some cases. This prevents unauthorized tampering of the gaming machine.

The jumper may be manually placed on the pinheads each time a user wants to install or load software onto the mass storage device. In some instances, two technicians are required as two keys may be necessary to open the brain box. In some gaming machine systems, if the system detects that the brain box is opened, the system may invalidate all the data. Thus, there may be several levels of protection that a user must overcome before installing a jumper on the pinheads.

In this example, if bit 6 is high then the jumper 218 may be removed and the mass storage device data protection system is activated, i.e., it is set to write protect. If the bit is low then the jumper 218 may be installed and the mass storage device data protection system is not activated, i.e., data may be written to the mass storage device. Processor 152 queries this bit in accordance with operating software instructions to determine whether write operation is allowed or disallowed.

In other embodiments a write-enabled/write-protected condition may be controlled by another device. In some such implementations, the write-enabled condition may be controlled according to signals received from another device via a device interface, e.g., via a network interface, a USB interface, a wireless interface, or the like. For example, a bit (here, bit 6) may be set via a remote host device, server, or the like. Such implementations may be made, for example, in the context of a server based gaming system such as discussed below with reference to FIG. 6. By allowing a user to remotely write to the bit via the remote server to change the status of the bit, the user will not have to physically place the jumper into the machine to deactivate the data protection system or physically remove the jumper to enable the data protection system.

In this example, a bit (e.g., bit 7) may become high whenever a data write is attempted to the mass storage device when the mass storage device is not in a write-enabled condition, e.g., when jumper 218 is removed. In order to clear the bit, a 0 may need to be purposefully written to the bit location. In one embodiment, the processor 152 may query this bit in accordance with operating software instructions to determine whether an attempt to write to mass storage device 156 has been detected. The remaining bits may be unused or used as desired by a user.

Register 220 may include a fixed command array 206 and a comparator user register 204. Fixed command array 206 may include commands that are directed to write commands. The write commands may be set by the ATA device interface specification, or any other general industry standard that defines command sets. Comparator user register 204 is a register through which additional commands to be excluded may be loaded into comparator 214. Although illustrated with commands to be excluded, in other implementations the comparator user register 204 may be used to store commands to be included. Any convenient number of commands may be indicated, according to the desired implementation. In one embodiment, up to four additional commands may be loaded into comparator user register 204 to cause a write fault if sent to the mass storage device 156. The comparator user register 204 may be read or written by setting the address in the control and status register 202 and then reading or writing the comparator user register 204 access port. Generally, if the system includes a comparator user register 204, upon start-up of the mass storage device protection system 154, the comparator user register 204 may have to be initialized in order to determine the commands needed.

As noted above, comparator user register 204 may be used to store additional command values that must not be executed. Thus, one purpose of the comparator user registers may be to include vendor-specific commands that could cause data to be modified on the mass storage device 156. An example sequence of operating software execution may include querying the mass storage device 156 to identify itself, comparing the identification to entries in a table of valid devices, and then loading the user registers with those vendor-specific commands that will cause data modification.

Command latch 208 may be connected to the bus of the respective channel that is being protected in the mass storage device 156. Command latch 208 may store the data values written by the processor 152 to the register 220. Values that are written to the command latch 208 are compared with values stored in the comparator 214. As illustrated in FIG. 2C, the de-serialized and extracted command written to the command latch are compared to ATA values stored in the register at 258 to determine if a write fault and/or a device reset should be generated. In some implementations, commands may be stored in the command latch 208 only if a write-enabled condition exists. According to some such implementations, commands may be stored in the command latch 208 if the write enable signal is high, e.g., when the jumper 218 is removed. If the signal is low, it signals that the write enable jumper 218 is installed and device writes are currently being allowed such that it may not be necessary to monitor commands.

The comparator 214, as noted above, may compare the values written to the command latch 208 with values stored in the register 220. Based upon the comparison, several reply signals may be generated by the mass storage device protection system 154 to the processor 152 and/or mass storage device 156. An invalid command or event is detected if a successful comparison takes place at 260 (FIG. 2C). In one embodiment, an invalid write command signal, such as an NMI signal, may be transmitted to the processor at 262 and the event may be logged by latching a bit in the control and status register 202. Preferably, the NMI signal immediately notifies the gaming machine system that a significant event has occurred that requires its attention. Additionally, the comparator may set a write fault bit (e.g., bit 7) in the control and status register 202 high to inform the gaming machine system that the event was a disallowed mass storage device command. In another embodiment, a system reset signal may be transmitted to the processor 152 to reset the gaming machine. The reset signal may signal the processor to reboot and re-authenticate the mass storage device 156 and/or entire gaming machine system to verify the integrity of the mass storage device 156 to ensure there is no corruption on the mass storage device 156. In one embodiment, the processor may reset the gaming machine system after a predetermined period of time to determine the reason for the reset. For example, the processor 152 may wait for 100 milliseconds to determine that the reset is necessary due to an unauthorized write command to the mass storage device 156.

Whether an NMI signal or reset signal is transmitted, the bus flow controller 212 may open the serial bus between the host system 120 and mass storage device 156 to stop all traffic to the mass storage device 156. Thus, the bus flow controller 212 may act as a switch to turn the communication between the host system 120 and mass storage device 156 on or off to disable or enable communication, respectively.

In this example, a valid command is detected if a match is not detected in the comparator at 260 (FIG. 2C). However, in other implementations, a valid command may be detected when a match is detected in the comparator at 260.

In normal gaming operation, i.e., when jumper 218 (FIG. 2B) is removed, attempting to write data to mass storage device 156 is not allowed. Upon application of power to the system, fixed command array 206 is operational and mass storage device protection system 154 actively monitors commands sent from processor 152 to the mass storage device 156. Commands that cannot modify data on the mass storage device 156 may be allowed without disturbance by mass storage device protection system 154. Commands that can modify data on the mass storage device 156 are contained within fixed command array 206. If the command is recognized and disallowed by comparator 214, an NMI (e.g., via bit 5 as discussed above) and/or reset signal, to reboot and re-authenticate the gaming machine system, may be transmitted to the processor 152 and/or mass storage device 156. In one embodiment, transmission of an NMI and/or reset signal immediately results in mass storage device 156 stopping all current operations in progress and responding to processor 152 with a "device not ready" signal (or the like).

In addition, operating software may take advantage of facilities provided by command and status register 202 for enhanced operation. For instance, operating software may query the status of the fault indicator (preferably bit 7 as discussed above) to determine whether a "device not ready" indication received from mass storage device 156 was caused by an attempt to write to mass storage device 156. The operating software may also be used to change the value of any other bit, such as bit 6 as discussed above.

As also discussed above, a means may be provided to enable writing data to mass storage device 156 by changing the state of jumper 218, for instance by inserting a jumper plug across pinheads or changing the setting of a switch. This may occur, e.g., during updates of software resident on mass storage device 156. To prevent a write-enabled condition at other times, access to jumper 218 should be controlled via physical security methods, such as locks and seals covering the jumper or switch. For additional protection, operating software may be provided with a "maintenance" mode, distinct from normal operation, in which software resident on mass storage device 156 is updated. Operating software may periodically monitor the state of the jumper signal via control and status register 202. If it is determined that jumper 218 is installed and the operating software is not in maintenance mode, game play may be immediately ceased and control transferred to error handling routines.

Figure 3:
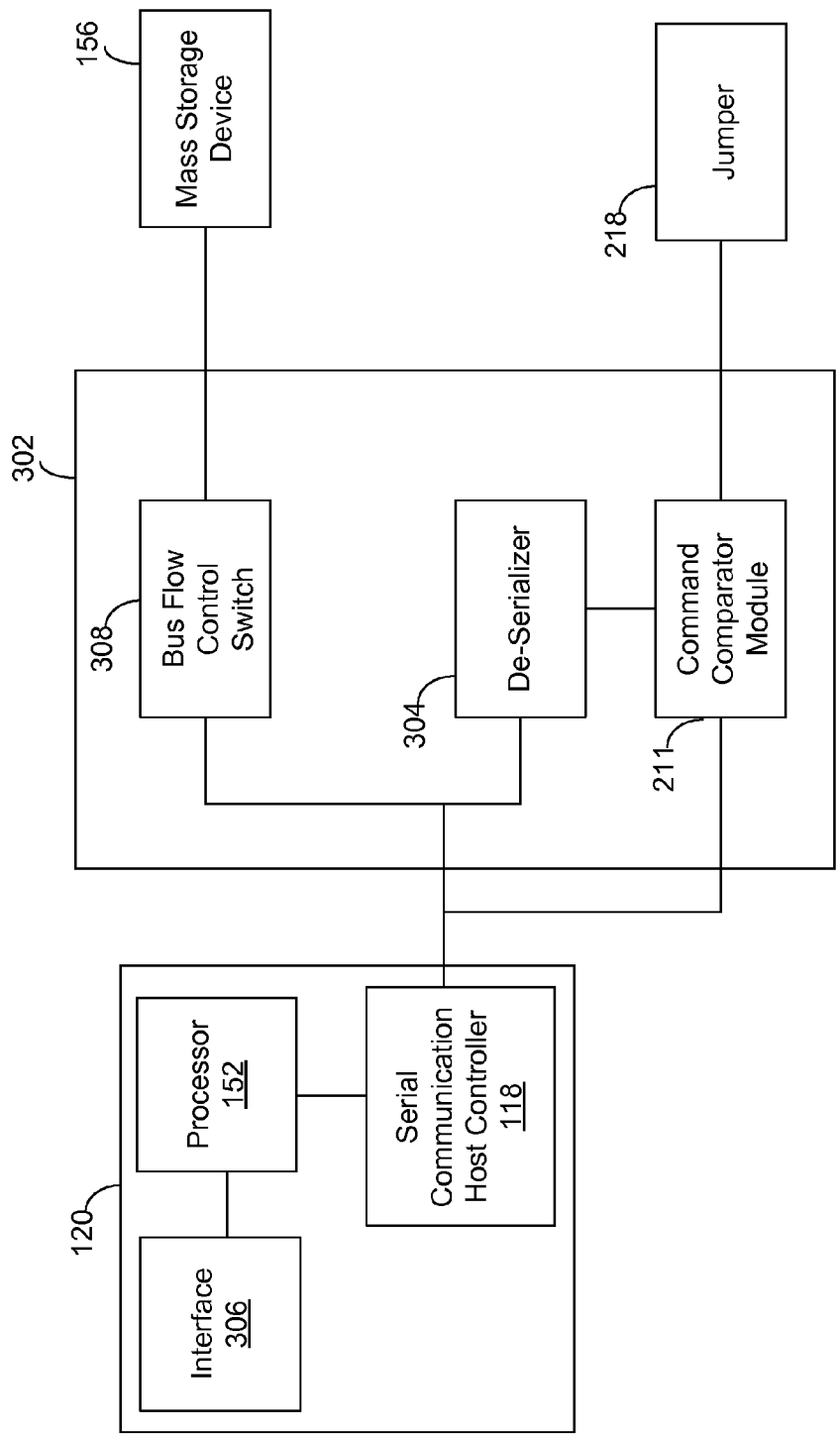
FIG. 3 illustrates another embodiment of a mass storage device protection system.

FIG. 3 illustrates another embodiment of a mass storage device protection system. This embodiment is similar to FIG. 2 without the use of the bus flow controller and SATA to PATA bridge. Rather, this embodiment provides for the use of a high speed logic device such as serial communication processor 302, which is configured to function as the mass storage data protection system. The logic device may be a processor, programmable logic device, or the like, capable of high speed serial communication, such as an application-specific integrated circuit (ASIC), a field programmable gate array (FPGA), or the like. Additionally, host system 120 may have an interface 306 to allow the host system 120 to communicate with other devices, such as other logic devices, master devices, or the like. The type of interface is not intended to be limiting, as any combination of hardware and software needed to allow the various input/output devices to communicate with the other devices may be used. Interface 306 may be configured for communication with processor 152.

The serial signal may be directly received by the communication processor 302 and replicated. One signal may be transmitted to the mass storage device 156 and the replicated signal may be de-serialized with de-serializer device 304 and transmitted to the command comparator module 211. The command comparator module 211 may function as described above with reference to FIG. 2B and will not be described in detail again herein. The communication processor 302 may have a bus flow control switch 308 such that should the command comparator module 211 determine that the signal is not a valid signal, the switch 308 may open the communication path and interrupt all signals to the mass storage device 156.

Figure 4A:
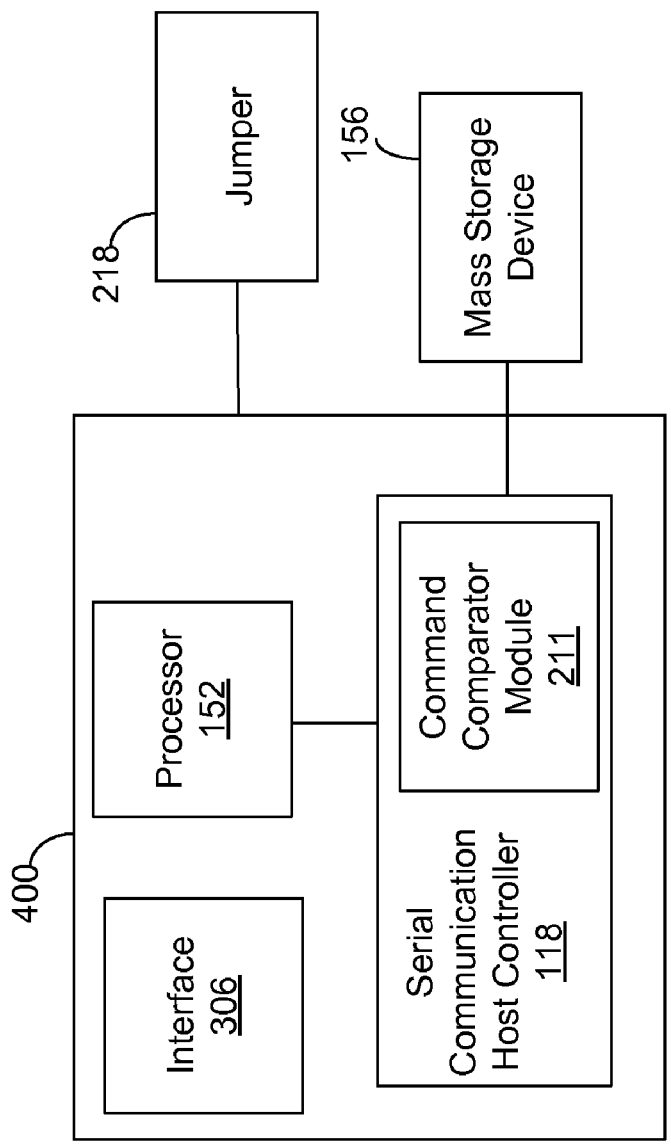
FIGS. 4A and 4B illustrate yet another embodiment of a mass storage device protection system.
Figure 4B:
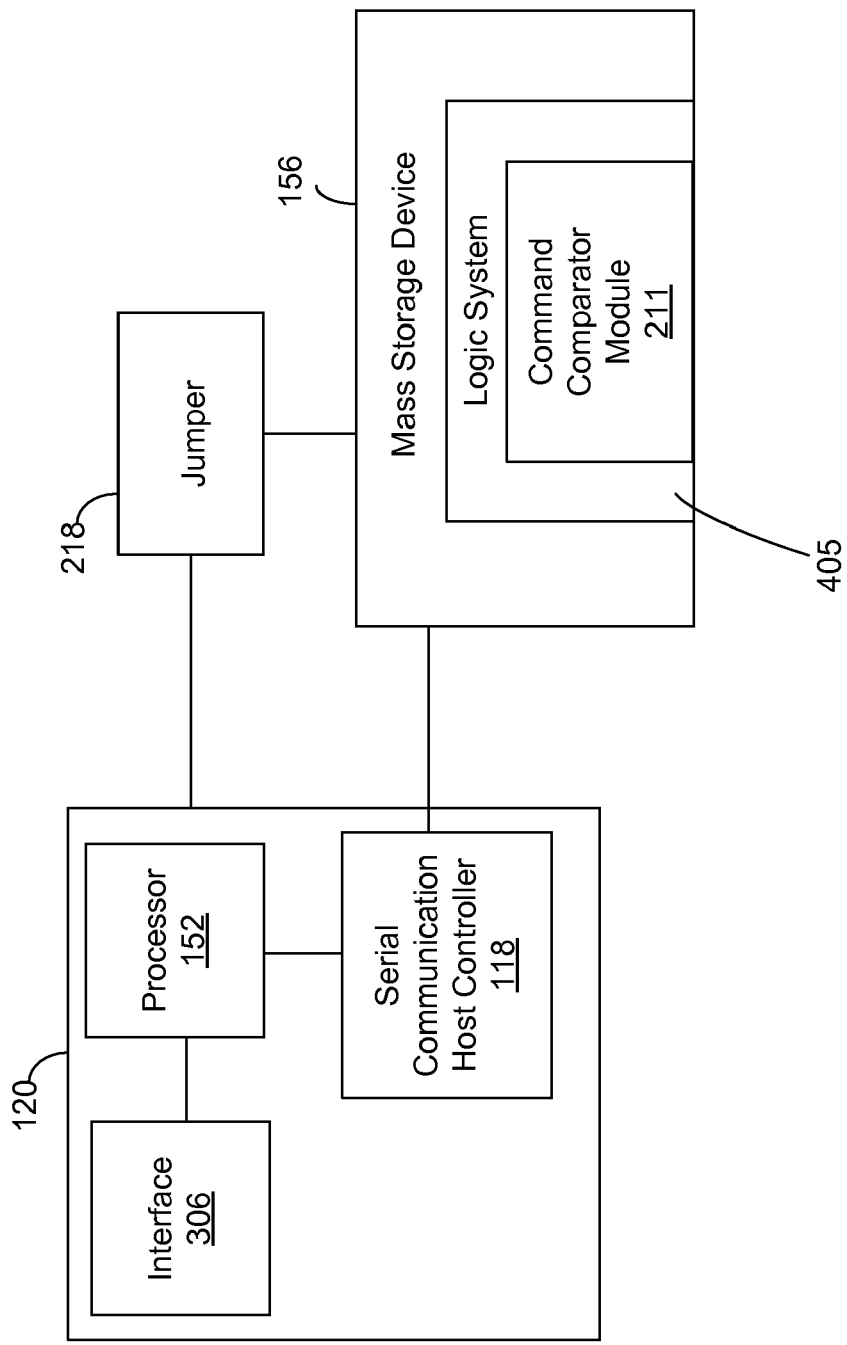

FIGS. 4A and 4B illustrate yet other embodiments of a mass storage device protection system. FIG. 4A illustrates the mass storage data protection system integrated with the serial communication host controller. FIG. 4B illustrates the mass storage data protection system integrated with the mass storage device itself. Referring now to FIG. 4A, the host system 400 may have an interface 306 to allow the host system 120 to communicate with other devices, such as other processors, master devices, or the like as discussed above.

The interface may be configured for communication with processor 152 to execute operating software for the gaming machine. The host system 120 may also have a serial communication host controller 118 to serially connect processor 152 to other network and storage devices, e.g., as discussed below. The serial communication host controller 118 may have a command comparator module 211 therein. The command comparator module 211 may be similar to the command comparator module as described above with reference to FIG. 2B and will not be described in detail again herein. Serial communication host controllor 118 may replicate the signal for transmission of one of the signals to the mass storage device 156 and the other signal to the command comparator module 211. Should the serial communication host controller 118 determine that the signal is an invalid signal, serial communication host controller 118 may disable any signal transmission to the mass storage device 156. The serial communication host controller 118 may also send a reset or NMI signal to the processor 152 and/or mass storage device 156. The reset signal may instruct the processor 152 to reset the entire gaming machine system and not only the mass storage device 156.

In some embodiments of the invention, a mass storage device may have an associated command comparator module or the like. One such embodiment will now be described with reference to FIG. 4B. In this example, mass storage device 156 includes a logic system 405 configured to perform the functionality of a command comparator module. Accordingly, command comparator module 211 is depicted in FIG. 4B as residing within logic system 405. Logic system 405 includes one or more logic devices such as processors, ASICs, programmable logic devices, or the like. Here, the mass storage device 156 may directly receive the serial command signal and determine whether the serial command signal is a valid signal. The command signal may be de-serialized by the mass storage device and transmitted to the command comparator module 211. The command comparator module 211 may be similar to the command comparator module as described above with reference to FIG. 2B and will not be described in detail again herein. Upon determining that a command is unauthorized, the mass storage device 156 may transmit a signal to the processor 152 to cut all commands and rights to the mass storage device 156. The mass storage device 156 may also send a reset or NMI signal to the processor 152. The reset signal may instruct the processor 152 to reset the entire gaming machine system and not only the mass storage device 156.

FIG. 5 illustrates an example gaming machine for implementing embodiments of the present invention. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, or the like. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine.

When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 5. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, or the like.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, or the like that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, or the like. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, or the like. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 5, when a user wishes to play the gaming machine 2, he or she inserts cash through the coin acceptor 28 or bill validator 30. Additionally, the bill validator may accept a printed ticket voucher that may be accepted by the bill validator 30 as indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 6:
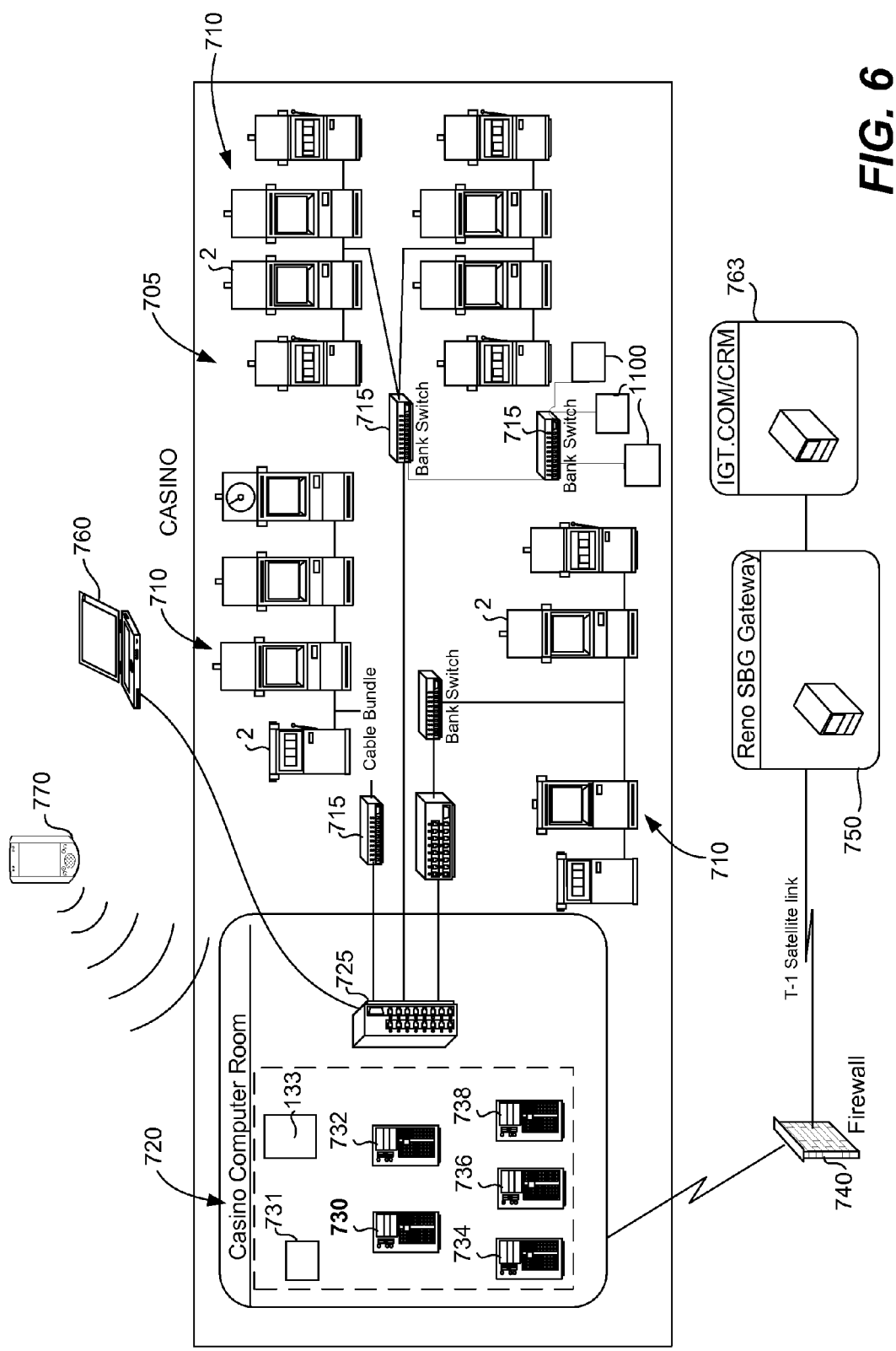
FIG. 6 illustrates an example network topology for implementing embodiments of the present invention.

FIG. 6 illustrates an example network topology for implementing embodiments of the present invention. Those of skill in the art will realize that this exemplary architecture and the related functionality are merely examples and that the present invention encompasses many other such embodiments and methods. Here, for example, a single gaming establishment 705 is illustrated, which is a casino in this example. However, it should be understood that some implementations of the present invention involve multiple gaming establishments.

Gaming establishment 705 includes 16 gaming machines 2, each of which is part of a bank 710 of gaming machines 2. In this example, gaming establishment 705 also includes a bank of networked gaming tables 1100. It will be appreciated that many gaming establishments include hundreds or even thousands of gaming machines 2 and/or gaming tables 1100, not all of which are included in a bank. However, the present invention may be implemented in gaming establishments having any number of gaming machines, gaming tables, or the like.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 725, which combines switching and routing functionality in this example) and/or the inclusion of other network devices not shown in FIG. 6. For example, some implementations of the invention include one or more middleware servers disposed between gaming machines 2 and server 730. Such middleware servers can provide various useful functions, including but not limited to the filtering and/or aggregation of data received from bank switches 715, from individual gaming machines and from other player terminals. Some implementations of the invention include load balancing methods and devices for managing network traffic.

Each bank 710 has a corresponding bank switch 715, which may be a conventional bank switch. Each bank switch is connected to server-based gaming ("SBG") server 730 via main network device 725, which combines switching and routing functionality in this example. Although various floor communication protocols may be used, some preferred implementations use IGT's open, Ethernet-based Super-SAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 730, License Manager 731, Arbiter 133, servers 732, 734, 736 and 738, and main network device 725 are disposed within computer room 720 of gaming establishment 705. In practice, more or fewer servers may be used. Some of these servers may be configured to perform tasks relating to player tracking, bonusing/progressives, or the like. Some servers may be configured to perform tasks specific to the present invention. License Manager 731 may also be implemented, at least in part, via a server or a similar device. Some exemplary operations of License Manager 731 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 730 can also be configured to implement, at least in part, various aspects of the present invention. Some preferred embodiments of SBG server 730 and the other servers shown in FIG. 6 include (or are at least in communication with) clustered CPUs, redundant storage devices, including backup storage devices, switches, or the like. Such storage devices may include a redundant array of inexpensive disks ("RAID"), back-up hard drives and/or tape drives, or the like. Preferably, a Radius and a DHCP server are also configured for communication with the gaming network. Some implementations of the invention provide one or more of these servers in the form of blade servers.

In some implementations of the invention, many of these devices (including but not limited to License Manager 731, servers 732, 734, 736 and 738, and main network device 725) are mounted in a single rack with SBG server 730. Accordingly, many or all such devices will sometimes be referenced in the aggregate as an "SBG server." However, in alternative implementations, one or more of these devices is in communication with SBG server 730 and/or other devices of the network but located elsewhere. For example, some of the devices could be mounted in separate racks within computer room 720 or located elsewhere on the network. For example, it can be advantageous to store large volumes of data elsewhere via a storage area network ("SAN").

In some embodiments, these components are SBG server 730 preferably has an uninterruptible power supply ("UPS"). The UPS may be, for example, a rack-mounted UPS module.

Computer room 720 may include one or more operator consoles or other host devices that are configured for communication with SBG server 730. Such host devices may be provided with software, hardware and/or firmware for implementing various aspects of the invention; many of these aspects involve controlling SBG server 730. However, such host devices need not be located within computer room 720. Wired host device 760 (which is a laptop computer in this example) and wireless host device (which is a personal digital assistant (PDA) in this example) may be located elsewhere in gaming establishment 705 or at a remote location.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 7:
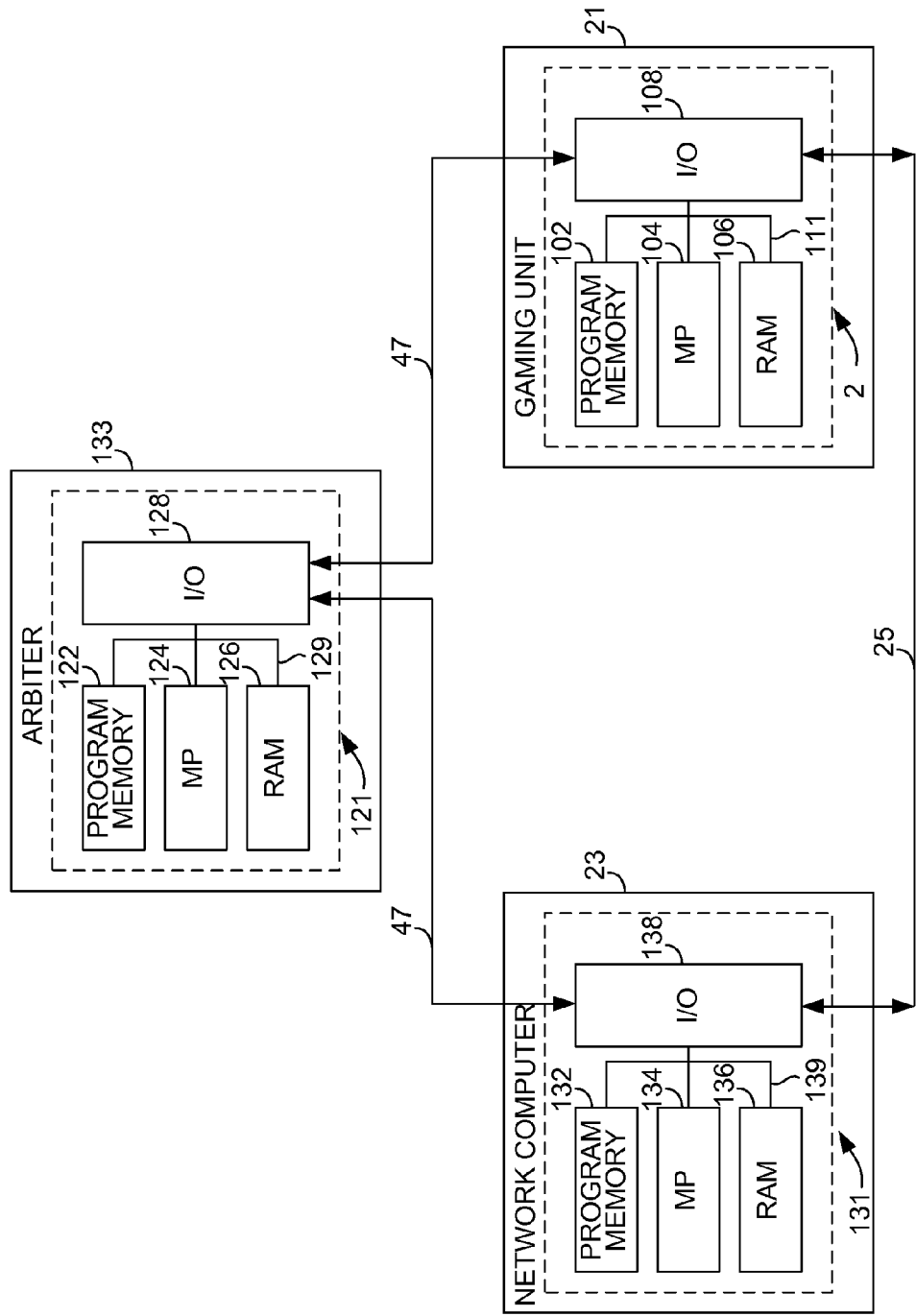
FIG. 7 is a block diagram of an exemplary simplified communication topology.

FIG. 7 is a block diagram of a simplified communication topology between a gaming unit 21, the network computer 23 and the Arbiter 133. Although only one gaming unit 21, one network computer 23 and one Arbiter 133 are shown in FIG. 7, it should be understood that the following examples may be applicable to different types of network gaming devices within the gaming network 12 beyond the gaming unit 21 and the network computer 23, and may include different numbers of network computers, gaming security arbiters and gaming units. For example, a single Arbiter 133 may be used for secure communications among a plurality of network computers 23 and tens, hundreds or thousands of gaming units 21. Likewise, multiple gaming security arbiters 46 may be utilized for improved performance and other scalability factors.

Referring to FIG. 7, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 7 as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 7 may each comprise multiple address/data buses, which may be of different types, and there may be an I/O circuit disposed between the address/data buses.

As shown in FIG. 7, the gaming unit 21 may be operatively coupled to the network computer 23 via the data link 25. The gaming unit 21 may also be operatively coupled to the Arbiter 133 via the data link 47, and the network computer 23 may likewise be operatively coupled to the Arbiter 133 via the data link 47. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, or the like.), game download information (e.g., game software and game licensing information) and personal information (e.g., social security number, personal preferences, or the like.) may be encrypted with stronger encryption techniques such as DES or 3DES to provide increased security.

As disclosed in further detail in the Arbiter Application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs or even cellular telephones. Referring once again to FIG. 6, one or more network devices in gaming establishment 705 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, or the like, while on the casino floor.

If a host device is located in a remote location, security methods and devices (such as firewalls, authentication and/or encryption) should be deployed in order to prevent the unauthorized access of the gaming network. Similarly, any other connection between gaming network 705 and the outside world should only be made with trusted devices via a secure link, e.g., via a virtual private network ("VPN") tunnel. For example, the illustrated connection between SBG 730, gateway 750 and central system 763 (here, IGT.com) that may be used for game downloads, or the like, is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks—Technologies and Solutions," by R. Yuan and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, or the like. Additionally VPNs may be implemented using a variety of protocols, such as, for example, IP Security (IPSec) Protocol, Layer 2 Tunneling Protocol, Multiprotocol Label Switching (MPLS) Protocol, or the like. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10, 000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 763 (in this example, IGT.com) to obtain the account information such as the customer's current and prior account status.

Moreover, such a secure connection may be used by the central system 763 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, or the like. Such information includes, but is not limited to, information regarding the revenue attributable to particular games at specific times of day, days of the week, or the like. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 763 may notify a local SBG server regarding new products and/or product updates. For example, central system 763 may notify a local SBG server regarding updates of new gaming software, gaming software updates, peripheral updates, the status of current gaming software licenses, or the like. In some implementations of the invention, central system 763 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 763 in response to such a notification.

Secure communication links allow notifications to be sent securely from a local SBG server to host devices outside of a gaming establishment. For example, a local SBG server can be configured to transmit automatically generated email reports, text messages, or the like, based on predetermined events that will sometimes be referred to herein as "triggers." Such triggers can include, but are not limited to, the condition of a gaming machine door being open, cash box full, machine not responding, verification failure, or the like.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 763 and the gaming establishments.

While embodiments and applications of this invention have been shown and described, it would be apparent to those skilled in the art having the benefit of this disclosure that many more modifications than mentioned above are possible without departing from the inventive concepts herein.

The invention claimed is:

1. A gaming machine, comprising:
 a cabinet to house a plurality of gaming machine components;
 a control system housed within the cabinet, comprising:
  a mass storage device;
  a processor configured to generate at least one serial write command signal to the mass storage device via a serial communication link;
  a storage protector situated between the mass storage device and the processor and configured for communication with the processor and mass storage device, the storage protector configured to do the following:
   intercept the at least one serial write command signal generated by the processor for reception by the mass storage device; and
   determine whether the at least one serial write command signal comprises an authorized command signal or an unauthorized command signal, wherein determining the authorization of the command signal includes comparing the command signal to stored user write commands within a register; and
  a logic device as part of the storage protector configured to do the following:
   replicate the at least one serial write command signal to generate a first serial write command signal and a second serial write command signal;
   transmit the first serial write command signal to the mass storage device;
   de-serialize the second serial write command signal; and
   interpret the de-serialized write command signal using a comparator module;
 means for providing a wagering game; and
 means for receiving a wager to play the wagering game.

2. The gaming machine of claim 1, wherein the storage protector is configured to transmit a fault signal to the mass storage device and processor when it is determined that the at least one serial write command signal comprises an unauthorized command signal.

3. The gaming machine of claim 1, wherein the storage protector is configured for communication with one or more external devices, wherein the storage protector is further configured to enable or disable write commands to the mass storage device according to instructions received from an external device.

4. The gaming machine of claim 1, wherein the storage protector comprises:
    a bus flow controller configured to replicate the at least one serial write command signal to generate a first serial write command signal and a second serial write command signal, the first serial write command signal transmitted to the mass storage device;
    a translator configured for communication with the bus flow controller and configured to de-serialize the second serial write command signal; and
    a comparator module configured for communication with the translator, the comparator module configured to interpret the de-serialized write command signal.

5. The gaming machine of claim 4, wherein the comparator module comprises:
    a command latch for storing commands from the storage protector;
    a register having a fixed command array to store a plurality of user write commands; and
    a comparator configured for communication with the command latch and the register, wherein the comparator is configured to issue a command when the command latch stores a user write command matching at least one of the plurality of user write commands.

6. The gaming machine of claim 4, wherein the comparator module comprises:
    a command latch for storing commands from the storage protector;
    a register having a fixed command array to store a plurality of user write commands; and
    a comparator configured for communication with the command latch and the register, wherein the comparator is configured to issue a command when the command latch stores a user write command matching at least one of the plurality of user write commands.

7. The gaming machine of claim 5, wherein the issued command comprises an invalid command and wherein a reply is a non-maskable interrupt or a reset signal.

8. The gaming machine of claim 5, wherein the issued command comprises a valid command signal transmitted to the processor.

9. The gaming machine of claim 6, wherein the issued command comprises an invalid command and wherein a reply comprises a non-maskable interrupt or a reset signal transmitted to the processor.

10. The gaming machine of claim 6, wherein the issued command comprises a valid command signal transmitted to the processor.

11. The gaming machine of claim 6, wherein the register further comprises information specifying whether mass storage device protection is activated.

12. A gaming machine, comprising:
    a cabinet to house a plurality of gaming machine components;
    a control system housed within the cabinet, comprising:
        a mass storage device;
        a processor configured to generate at least one serial write command signal to the mass storage device via a serial communication link;
        a storage protector configured for communication with the processor and mass storage device, the storage protector configured to do the following:
            intercept the at least one serial write command signal generated by the processor for reception by the mass storage device; and
            determine whether the at least one serial write command signal comprises an authorized command signal or an unauthorized command signal, wherein determining the authorization of the command signal includes comparing the command signal to stored user write commands within a register; and
        a logic device as part of the storage protector configured to do the following:
            replicate the at least one serial write command signal to generate a first serial write command signal and a second serial write command signal;
            transmit the first serial write command signal to the mass storage device;
            de-serialize the second serial write command signal; and
            interpret the de-serialized write command signal using a comparator module;
    means for providing a wagering game; and
    means for receiving a wager to play the wagering game.

* * * * *